United States Patent Office 3,243,422
Patented Mar. 29, 1966

3,243,422
CATALYSTS FOR POLYMERIZATION
Victor D. Aftandilian, Watertown, and James C. MacKenzie, Wellesley Hills, Mass., assignors to Cabot Corporation, Boston, Mass., a corporation of Delaware
No Drawing. Filed May 31, 1963, Ser. No. 284,373
20 Claims. (Cl. 260—94.9)

This invention relates to the polymerization and copolymerization of mono- and di-olefins such as ethylene, propylene, butene-1, styrene, isoprene and 1,3-butadiene, and includes within its scope novel catalysts for such polymerization reactions.

Accordingly, it is a principal object of the present invention to provide novel catalysts and catalyst components for the polymerization of mono- and di-olefins.

Another object of the present invention is to provide a novel process for polymerizing mono- and di-olefins and mixtures thereof.

Other objects of the present invention will in part be obvious and will in part appear hereinafter.

In acordance with the present invention mono- and di-olefins are polymerized or copolymerized with a catalyst comprising (a) the product formed by the reaction of certain halo-hydrides of Group IV$b$ metals and hydroxyl groups on the surface of a finely-divided particulate inorganic solid and (b) a halide-type compound of a Group IV$a$, V$a$ or VI$a$ metal. The polymerization or copolymerization reaction can be effected at suitable temperatures within the range of from about $-25°$ C. to about $250°$ C., and pressures from below atmospheric upwardly to any desired maximum pressures, for example, 30,000 p.s.i.g. or even higher pressures.

Inorganic solids suitable for the purposes of the present invention generally include any inorganic compound which is available in finely-divided particulate form with hydroxyl groups on the surface thereof. For example, oxides such as silica, alumina, zirconia, thoria and magnesia, silicates such as chrysotile, actinolite and crocidolite, and aluminates such as corundum and bauxite are all generally suitable for purposes of the present invention. It should be noted that the ultimate efficiency of the catalyst components produced in accordance with the present invention is generally highly dependent upon the number of surface hydroxyl groups present per gram of finely-divided inorganic solid. Accordingly, in preparing the surface reacted finely-divided solids of the present invention, it should be kept in mind that the smaller the average particle size of the solid and the larger the quantity of hydroxyl groups on the surface thereof, the greater will be the potential activity and efficiency of the catalyst component producible therefrom. Therefore, it is important to use as the starting material particulate, finely-divided solids having an average particle diameter of less than about 1 micron, and preferably less than about 0.1 micron.

Halo-hydrides of Group IV$b$ metals (hereinafter generally referred to as "organometallic compounds") suitable for the purposes of the present invention are the compounds conforming to the empirical formula

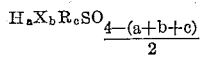

wherein each H is hydrogen; $a$ is a number from 1 to 3; each X is a halogen; $b$ is a number from 1 to 3; each R is chosen from the group consisting of any hydrocarbon radical, alkoxy radical and aryloxy radical; $c$ is a number from 0 to 2; S is a metal chosen from the group consisting of the metals of Group IV$b$ of the Mendeleev Periodic System; O is oxygen; and the sum of $a+b+c$ is not greater than 4.

Although it is appreciated that when in the above empirical formula $c$ is 0, the resulting compounds cannot normally be termed organometallic compounds, it is intended that for the purposes of the present invention, all those compounds included within the scope of said empirical formula, be included within the scope of the generic term "organometallic compound." Accordingly, in the present specification and claims, it is intended, and therefore, it should be understood, that the term "organometallic compound" refers to all compounds included within the scope of the above-defined empirical formula. In addition, it is pointed out that while, strictly speaking, silicon and germanium are not metals, it is intended, and therefore it should be understood, that for the purposes of the present specification and claims, silicon and germanium are metals.

Specific examples of R groups for substitution in the above formula include methyl; 2-methyl-2-butenyl; n-dodecyl; 4-cyclohexylethyl; methylnaphthylethyl; 2,2,1-bicycloheptyl; tolyl; xylyl; xenyl; methoxy; isobutoxy; n-octyloxy; phenoxy and 1,2-naphthoxy.

Specific examples of compounds conforming to the formula

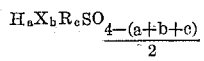

which are suitable for the purposes of the present invention are trichlorosilane—Cl$_3$SiH; methyldichlorosilane—CH$_3$Cl$_2$SiH; methyldifluorosilane—CH$_3$F$_2$SiH; diethylbromosilane—(C$_2$H$_5$)$_2$BrSiH; phenoxybromosilane—(C$_6$H$_5$O)BrSiH$_2$; iodosilane—ISiH$_3$; dichloro-n-hexylgermane—(n-C$_6$H$_{13}$)Cl$_2$GeH; bromodimethylstannane—(CH$_3$)$_2$BrSnH; chlorodiphenylstannane—(C$_6$H$_5$)$_2$ClSnH; dichloromethylplumbane—CH$_3$Cl$_2$PbH; trichlorogermane—Cl$_3$GeH; bromogermane—BrGeH$_3$; dichloro-i-propylstannane—(i-C$_3$H$_7$)Cl$_2$SnH; diiodopentylgermane—(C$_5$H$_{11}$)I$_2$GeH; and the like; cyclic hydrogen polymers of Group IV$b$ metals such as (HClSiO)$_3$; and linear hydrogen polymers of Group IV$b$ metals such as ClCH$_3$HSiOSiHCH$_3$Cl and BrCH$_3$HGeOGeHCH$_3$Br.

The conditions under which reaction between the organometallic compound and the finely-divided solid can be accomplished are subject to considerable variation. However, in order to obtain a catalyst component with exceptionally high activity and reproducible character and performance it has been found to be all important that the finely-divided inorganic solid be essentially dry and anhydrous (i.e. free of molecular water in any form) at the time it is brought into contact with the organometallic compound. In addition, it is recommended that the reaction of the inorganic solid and the organometallic compound be accomplished so as to allow gaseous by-products of the reaction to be eliminated from the reaction zone in order to thereby insure that said reaction goes to completion. Generally, the said reaction can be carried out by contacting said inorganic solid with said organometallic compound, preferably in a solution thereof in an inert hydrocarbon medium, and maintaining the two reactants in intimate contact for a period of time sufficient to effect the desired chemical reaction resulting in the chemical bonding of the organometallic compound to the inorganic solid.

Generally speaking, almost any temperature between about $0°$ C. and about $300°$ C. and even higher temperatures can be used satisfactorily, but $20°$ C. to about $125°$ C. is generally preferred. Assuming provision is made for intimate contact of the dry inorganic solid and the organometallic compound, the minimum time required to accomplish the chemical reaction will vary from periods of the order of about 10 hours at $25°$ C. to periods of the order of about 30 minutes at temperatures of $150°$ C. or over. Temperatures substantially higher than about $300°$ C., e.g., $350°$ C., are completely needless and therefore of little or no interest.

Of course, the reaction can also be carried out by other means, such as by exposing the inorganic solid to the vapors of the organometallic compound, provided, of course, that said solid is exposed to sufficient quantities of the vapors of said compound under conditions of time and temperature that will foster reaction. Said vapors can be supplied under their own vapor pressures using partial vacuum if necessary, or with the aid of a dry, inert carrier gas such as nitrogen. This vapor phase treatment can be accomplished in any suitable manner such as by circulating the vapors through the particulate solid in a fixed or moving bed reactor.

It is believed, though there is no intention to be bound by this explanation, that the type of reaction that occurs is correctly illustrated by the following illustrative equations, wherein silica and alumina represent the finely-divided inorganic solids and dichlorosilane and diethyl-bromogermane represent the organometallic compounds:

Equation 1

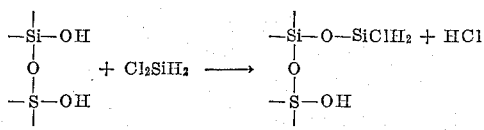

Equation 2

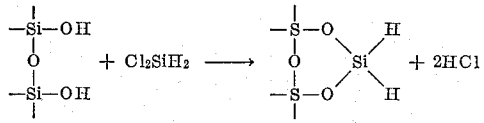

Equation 3

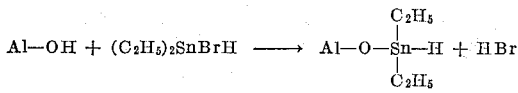

It is pointed out that the organometallic compounds of the present invention must comprise at least one halogen atom and one hydrogen atom in order to produce the cocatalysts of the present invention. Thus, the halogen atom is necessary if a reaction between the organometallic compound and a hydroxyl group on the surface of the inorganic solid is to occur, while the hydrogen radical is necessary for the formation of the catalyst when the inorganic solid bearing —SH bonds on the surface thereof is combined with the halide type compound. Greatly preferred, however, are organometallic compounds which comprise at least two hydrogen radicals per molecule.

Elimination of the by-products of the reaction from the reaction zone, i.e., from the reaction medium, can be accomplished in any convenient manner such as, by sweeping the reaction vessel with an inert gas, by carrying out the reaction at sufficiently elevated temperatures while stirring to drive off by-products, and by complexing or reacting said by-products with suitable substances such as tertiary amines, tertiary arsines, tertiary phosphines, terpenes, terpinenes, tetrasubstituted hydrazines, carbides such as calcium carbide, and other substances which will react or complex with said by-products and thereby eliminate them.

Halide-type compounds of Groups IV$a$, V$a$ and VI$a$ (hereinafter generally referred to as transition metal halides) suitable for the purposes of the present invention are the compounds conforming to the general empirical formula:

$$TO_yX_z$$

wherein T is a metal of Group IV$a$, V$a$ or VI$a$ (where the group numbers correspond to the Mendeleev Periodic System); O is oxygen; $y$ is a number from 0 to 2; each X is any halogen; and $z$ is a number from 1 to 6.

Examples of suitable compounds conforming to said general formula are halides such as zirconium tetrachloride, vanadium tetrachloride, and titanium tetraiodide, and oxyhalides such as chromium oxychloride and vanadium oxychloride.

It is pointed out that catalysts of the present invention formed with certain of the surface reacted inorganic solids, i.e., the halo-silane, halo-germane reacted inorganic solids, and transition metal halides require activation by heating. In the case of silanes, temperatures above about 100° C. and preferably above about 130° C. for at least about 1 hour are normally required. At higher temperatures, shorter periods of time are required, at substantially lower temperatures, the catalyst is either not formed at all or is of inferior quality.

Using the catalysts of this invention, polymerization and copolymerization of olefinic monomers can often be accomplished in the absence of liquids other than the monomers themselves, solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also, members of the aromatic hydrocarbon series, such as isopropyl benzene, ethyltoluene, hemimellitene, pseudocumene, isodurene, isoamylbenzene, and particularly the mono-nuclear aromatic hydrocarbons such as xylenes, mesitylene and xylene-p-cymene mixtures, and the like are completely suitable.

The proportion of surface reacted finely-divided solid to transition metal halide utilized in preparing the finished catalyst is not usually a critical feature of the process. Moreover, if this proportion is expressed as a simple molar or weight ratio, it may not be particularly meaningful because as indicated above, the efficiency of said surface reacted solids (on a weight or molar basis) is highly dependent upon the proportion of hydridic Group IV$b$ metal (i.e., Group IV$b$ metal having hydrogen attached thereto) chemically attached thereto. Accordingly, in order to be most meaningful, the relationship between amounts of the two components of the finished catalyst should be expressed as some function of the amount of Group IV$b$ metal, which is chemically attached to the surface of the finely-divided solid. We have found from experience that an atomic ratio of from 0.1 to 5 and preferably 0.3 to 3 of the transition metal to hydridic Group IV$b$ metal chemically attached to the surface of the finely-divided solid is desirable. In addition, it should be borne in mind that finely-divided solids bearing chemically bound thereto hydridic Group IV$b$ metal having two hydrogen radicals associated with each Group IV$b$ metal atom are greatly preferred.

The quantity of catalyst, i.e., comprising both the surface reacted finely-divided solid and the transition metal halide to be utilized in the polymerization reaction may vary, the precise quantity selected for use being dependent upon the desired rate of polymerization, the geometry of the reaction zone, the composition of the particular olefinic charging stock, temperature and other reaction variables. It should be pointed out that in general the efficiency of the catalysts of the present invention is extremely high and accordingly, the total quantity of catalyst that need be employed based on the weight of the charging stock is very small particularly when (a) a very fine particle size metal or metalloid oxide (preferably pyrogenic) has been utilized as the finely-divided solid and (b) the organometallic compound—finely-divided solid reaction has been conducted in such a manner as to leave more than one hydrogen radical attached to most of the Group IVb metal atoms on the surface of the said solid.

Harmful impurities in the liquid hydrocarbon reaction medium can be effectively neutralized prior to the formation therein, or addition thereto, of the catalyst or catalyst components of this invention by treating the liquid medium with a metal alkyl or a transition metal compound. The olefinic charging stocks can also be purified by any known means such as bubbling said stocks through a solution of a metal alkyl in a hydrocarbon solvent prior to their introduction into the polymerization reactor.

Temperature control during the course of the polymerization process can be readily accomplished when a liquid hydrocarbon diluent is utilized because of the presence in the reaction zone of a large liquid mass having relatively high heat capacity. The liquid hydrocarbon reaction medium can, in turn, be cooled by indirect heat exchange with a suitable coolant inside or outside the reaction zone.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

*Example 1*

To a 2000 milliliter, glass, three neck reaction flask equipped with a stirrer, condenser and nitrogen inlet and outlet tubes there is charged 20 grams of "Cab-O-Sil," a pyrogenic silica produced by Cabot Corporation, and which has an average particle diameter of about 10 millimicrons and a hydroxyl group content on the surface thereof of about 1.5 milliequivalents per gram. Next, there is added to said vessel 1650 milliliters of toluene and the resulting slurry is dried by being heated to, and maintained at, the boiling point of toluene, i.e., about 111° C., for about 24 hours while a water/toluene azeotrope is removed from the reaction vessel by periodic distillation until 450 milliliters of distillate has been removed. The vessel is then cooled and charged with 20 millimoles of dichlorophenylsilane ($C_6H_5$)$SiCl_2H$. The resulting slurry is then heated to, and maintained at, refluxing temperature for 8 hours with continuous stirring while the contents are swept with a stream of dry nitrogen. Subsequently, the extent of the reaction between the dichlorophenylsilane and the hydroxyl groups on the surface of the silica is determined by measuring the quantity of HCl that was produced and by testing the liquid contents of the vessel for the absence therein of dichlorophenylsilane, and the said silica is found to have 20 milliatoms of silicon bound to the surface thereof. 180 milliliters of this slurry containing about 3 milliatoms of silicon chemically bound to the surface of about 3 grams of silica, is then transferred from this reaction vessel to a 500 cc. stainless steel bomb which has been previously flushed with dry nitrogen. Next, said bomb is charged with 1 millimole of titanium tetrachloride followed by pressurization to 200 p.s.i. with ethylene. The bomb is then heated to and maintained at, about 80° C. for 6 hours with continuous agitation, while a pressure of about 200 p.s.i. is maintained therein by the periodic addition of ethylene. Subsequently, the reaction products are analyzed and it is found that no solid polymer has been produced.

*Example 2*

This example is essentially a duplicate of Example 1 with the exception that in this example the catalyst is activated by heating prior to polymerization. 3 grams of the surface reacted silica of Example 1 containing about 3 milliatoms of silicon chemically bonded to the surface thereof and suspended in about 180 milliliters of toluene is charged to a 500 milliliter, stainless steel, reaction bomb. Next, there is added 1 millimole of titanium tetrachloride and the bomb is sealed, heated to and maintained at about 150° C. and continuously agitated for 2 hours. Said bomb is then cooled to, and thereafter maintained at, about 80° C. for 6 hours, while the pressure is maintained at 200 p.s.i. by the periodic addition into the bomb of ethylene. The reaction products are analyzed and it is found that about 127 grams of solid polyethylene have been produced.

*Example 3*

To a 2000 milliliter, three neck, glass reaction vessel there is added 20 grams of "Alon," a pyrogenic alumina produced by Deutsche Gold- und Silber-Scheideanstalt Vormals Roessler, and which has an average particle diameter of about 10–40 millimicrons and a hydroxyl group content on the surface thereof of about 0.7 milliequivalents per gram. Next, there is added to said vessel 1500 milliliters of benzene and the resulting slurry is dried azeotropically for 20 hours until about 500 milliliters of a water/benzene azeotrope have been removed. The vessel is then cooled to ambient temperature and charged with 9 millimoles of diethylchlorostannane ($C_2H_5$)$_2$SnClH. The resulting slurry is then refluxed at about 80° C. for about 6 hours with continuous stirring while being swept by a stream of dry nitrogen. Subsequently, the extent of reaction between the diethylchlorostannane and the hydroxyl groups on the surface of the alumina is determined by measuring the quantity of HCl that was produced and by testing the liquid contents of the vessel for the absence therein of diethylchlorostannane, and the said alumina is found to have 9 milliatoms of silicon chemically bound to the surface thereof. A 333 milliliter portion of this slurry containing about 3 milliatoms of tin bound to the surface of about 6.7 grams of alumina is then transferred, without exposure to the atmosphere, to a 1000 milliliter stainless steel, reaction bomb. There is then charged to said bomb 1 millimole of vanadium oxychloride previously dissolved in 100 milliliters of anhydrous benzene. The bomb is then sealed, maintained at about ambient temperature and continuously agitated for about 8 hours. Next, said bomb is cooled to 0° C. and there is charged thereinto 400 millimoles of inhibitor-free styrene monomer. Said bomb is then continuously stirred and gradually warmed at an average rate of about 10° C./hour for 4 hours. The reaction products are analyzed and it is found that solid polystyrene has been formed.

*Example 4*

To a 1000 milliliter, three neck, glass reaction vessel equipped with a stirrer, a condenser and nitrogen inlet and outlet tubes, there is added 10 grams of "Cab-O-Sil" and 700 milliliters of p-xylene. The resulting slurry is then dried azeotropically for about 14 hours until about 200 milliliters of a water/p-xylene azeotrope is removed. The vessel is cooled to ambient temperatures and is then charged with 10 millimoles of phenoxybromogermane— $C_6H_5OGeBrH_2$. The vessel is thereafter continuously stirred, and maintained at a temperature of about 99.2° C. for a period of about 10 hours while the contents of the gas phase are swept by a stream of dry $N_2$. Subsequently, the extent of the reaction between the phenoxybromogermane and the silica is determined by measuring the quantity of HBr removed from the vessel by the nitrogen stream, and by testing the liquid contents of the vessel for the absence therein of phenoxybromogermane and the said silica is found to have 10 milliatoms of germanium chemically bound to the surface thereof. A 200 milliliter portion of this slurry, containing about 4 milliatoms of germanium bound to the surface of about 4 grams of silica is then transferred, without exposure to the atmosphere, to a 1000 milliliter stainless steel, stirred autoclave previously flushed with dry nitrogen. Next, there is charged to said autoclave 3.5 millimoles of zirconium tetrabromide previously dissolved in 300 milliliters of anhydrous p-xylene. Said autoclave is then heated to and maintained at about 135° C. with continuous stirring for about 4 hours. The autoclave is then cooled to, and thereafter maintained at, about 80° C. and there is introduced thereinto 300 millimoles of 1-butene followed by pressurization to 350 p.s.i. with ethylene. Next said autoclave is continuously stirred for about 10 hours. Subsequent analysis of the reaction products reveals that a butene-1 ethylene copolymer has been produced.

The polymers produced by the catalysts of the present invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black, silicas, extenders, plasticizers, pigments, insecticides, fungicides, etc., can be incorporated into the polymers.

Obviously, many changes can be made in the above described examples and procedures without departing from the scope of the invention. For example, although only chloro- and bromo-group IVb metal hydrides are mentioned in the above examples, fluoro- and iodo-hydrides are also suitable for the purposes of the present invention. For example, methyldifluorosilane—$CH_3SiF_2H$ is entirely suitable.

Also, pyrogenically coformed, or coprecipitated metal oxides, or metal oxides coformed with, or mixed with, other compounds are suitable for the purposes of the present invention.

Accordingly, it is intended that the above disclosure be regarded as illustrative and as in no way limiting the scope of the invention.

What we claim is:

1. A catalyst component comprising a finely-divided inorganic solid having an average particle diameter of less than about 0.1 micron and carrying in chemical combination surface structures conforming to the general formula

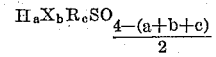

wherein each H is hydrogen; $a$ is a number from 1 to 3; each X is a halogen; $b$ is a number from 0 to 2; each R is chosen from the group consisting of any hydrocarbon radical, alkoxy radical, and aryloxy radical; $c$ is a number from 0 to 2; S is a metal chosen from the group consisting of the metals of Group IVb; O is oxygen; and the sum of $a+b+c$ is not greater than 4; and where said structures are chemically linked from S to at least one oxygen atom in the surface of said solid.

2. The catalyst component of claim 1 wherein S is silicon.

3. The catalyst component of claim 1 wherein S is germanium.

4. The catalyst component of claim 1 wherein S is tin.

5. The catalyst component of claim 1 wherein each R is an alkyl group.

6. A process for producing a catalyst component which comprises reacting at temperatures of from between about 0° C. and about 300° C. for periods of from about 30 minutes to about 10 hours, the lower the temperatures used, the longer being the minimum time required, chemically found hydroxyl groups on the surface of a particulate finely-divided inorganic solid having an average particle diameter of less than about 0.1 micron and a compound conforming to the formula:

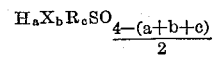

wherein each H is hydrogen; $a$ is a number from 1 to 3; each X is a halogen; $b$ is a number from 1 to 3; each R is chosen from the group consisting of any hydrocarbon radical, alkoxy radical and aryloxy radical; $c$ is a number from 0 to 2; S is a metal chosen from the group consisting of the metals of Group IVb; O is oxygen; and the sum of $a+b+c$ is not greater than 4.

7. The process of claim 6 wherein the reaction between said hydroxyl groups and the compound conforming to the formula:

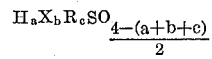

is accomplished at temperatures between about 0° C. and about 125° C.

8. The process of claim 6 wherein said finely-divided solid has been dried prior to reaction so as to remove substantially all the free and physically bound water therefrom.

9. The process of claim 6 wherein said finely-divided solid is chosen from the group consisting of alumina and silica having an average particle diameter of less than 50 millimicrons.

10. The process of claim 6 wherein in the formula:

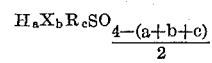

$a$ is 1; $b$ is 1; $c$ is 2; and each R is any alkyl radical.

11. The process of claim 6 wherein in the formula:

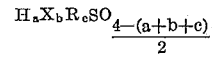

$a$ is 2; $b$ is 1; $c$ is 1; and the R is any alkyl radical.

12. The process of claim 10 wherein in the formula:

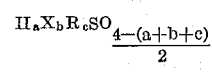

S is silicon.

13. The process of claim 11 wherein in the formula:

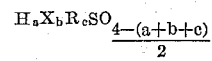

S is silicon.

14. A catalyst for the polymerization of a mono-olefin, mono-olefins, a di-olefin, diolefins, and mixtures thereof which comprises (a) a finely-divided inorganic solid having an average particle diameter of less than about 0.1 micron and carrying in chemical combination surface structures conforming to the general formula

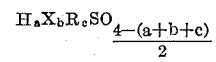

wherein each H is hydrogen; $a$ is a number from 1 to 3; each X is a halogen; $b$ is a number from 0 to 2; each R is chosen from the group consisting of any hydrocarbon radical, alkoxy radical, and aryloxy radical; $c$ is a number from 0 to 2; S is a metal chosen from the group consisting of the metals of Group IVb; O is oxygen; and the sum of $a+b+c$ is not greater than 4; and where said structures are chemically linked from S to at least one oxygen atom in the surface of said solid, and (b) a compound conforming to the general formula

where T is chosen from the group consisting of the metals of Groups IVa, Va and VIa; O is oxygen; $y$ is a number from 0 to 2; each X is any halogen; and $z$ is a number from 1 to 7.

15. The catalyst of claim 14 wherein each X in the general formula:

is chlorine.

16. The catalyst of claim 14 wherein said compound conforming to the formula:

$$TO_yX_z$$

is chosen from the group consisting of titanium tetrachloride, zirconium tetrachloride and titanium trichloride.

17. The catalyst of claim 14 wherein T in the formula $$TO_yX_z$$

is titanium.

18. A process for polymerizing a substance chosen from the group consisting of a mono-olefin, mixtures of mono-olefins, a di-olefin, mixtures of di-olefins, and mixtures thereof which comprises contacting said substance at temperatures between about 25° C. and 250° C., with a catalyst comprising:

(a) a finely-divided inorganic solid having an average particle diameter of less than about 0.1 micron and having chemically bound thereto surface structures conforming to the general formula $$H_aX_bR_cSO_{\frac{4-(a+b+c)}{2}}$$

wherein each H is hydrogen; $a$ is a number from 1 to 3; each X is a halogen; $b$ is a number from 0 to 2; each R is chosen from the group consisting of any hydrocarbon radical, alkoxy radical, and aryloxy radical; $c$ is a number from 0 to 2; S is a metal chosen from the group consisting of the metals of Group IV$b$; O is oxygen; and the sum of $a+b+c$ is not greater than 4; and where said structures are chemically linked from S to at least one oxygen atom in the surface of said solid, and (b) a compound conforming to the general formula $$TO_yX_z$$

where T is chosen from the group consisting of the metals of Groups IV$a$, V$a$ and VI$a$; O is oxygen; $y$ is a number from 0 to 2; each X is any halogen; and $z$ is a number from 1 to 7.

19. The process of claim 18 wherein the substance polymerized is an olefin.

20. The process of claim 18 wherein the substance polymerized is ethylene.

References Cited by the Examiner

UNITED STATES PATENTS

| | | | |
|---|---|---|---|
| 3,008,943 | 11/1961 | Guyer | 260—74.9 |
| 3,048,574 | 8/1962 | Wiberg | 260—94.9 |
| 3,166,544 | 1/1965 | Orzechowski | 260—94.9 |

JOSEPH L. SCHOFER, *Primary Examiner.*

FRED L. DENSON, *Assistant Examiner.*